US009405000B2

(12) United States Patent
Yeh et al.

(10) Patent No.: US 9,405,000 B2
(45) Date of Patent: Aug. 2, 2016

(54) POSITIONING METHOD AND POSITIONING SYSTEM BASED ON LIGHT INTENSITY (71) Applicant: Industrial Technology Research Institute, Hsinchu (TW)

(72) Inventors: Lun-Wu Yeh, Hualien County (TW); Che-Yen Lu, Kaohsiung (TW); Yueh-Feng Lee, Taipei (TW); Yu-Hsuan Lin, Hsinchu County (TW); Yu-Chee Tseng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 593 days.

(21) Appl. No.: 13/665,939

(22) Filed: Nov. 1, 2012

(65) Prior Publication Data

US 2013/0088725 A1 Apr. 11, 2013

Related U.S. Application Data (63) Continuation-in-part of application No. 12/469,677, filed on May 20, 2009, now abandoned.

(30) Foreign Application Priority Data

Mar. 6, 2009 (TW) .............................. 98107346 A (51) Int. Cl.
*G01B 11/03* (2006.01)
*G01S 5/16* (2006.01)
(Continued)

(52) U.S. Cl.
CPC ... *G01S 5/16* (2013.01); *G01S 1/70* (2013.01); *G01B 11/03* (2013.01); *G01B 11/245* (2013.01); *G01C 3/08* (2013.01); *G01S 5/08* (2013.01); *G01S 5/10* (2013.01)

(58) Field of Classification Search
CPC ............... G01S 5/16; G01S 1/70; G01S 5/08; G01S 5/10; G01B 11/245; G01B 11/03; G01C 3/08
USPC ........................... 356/615, 623; 315/149–155
See application file for complete search history.

(56) References Cited

U.S. PATENT DOCUMENTS 4,368,406 A     1/1983  Kruzich et al.
4,884,008 A  * 11/1989  Bossler ................... F21V 14/04
                                                              315/152

(Continued)

FOREIGN PATENT DOCUMENTS

CN          1926790       3/2007
CN        101356450       1/2009

(Continued)

OTHER PUBLICATIONS

"Second Office Action of China Counterpart Application", issued on Jun. 19, 2012, p. 1-p. 5.

(Continued)

*Primary Examiner* — Rebecca C Bryant
(74) *Attorney, Agent, or Firm* — Jianq Chyun IP Office (57) ABSTRACT A positioning method and a positioning system based on light intensity are provided. The positioning system comprises a lighting system, a sense feedback device and a positioning module. The lighting system comprises at least three point light sources and sequentially adjusts luminance of these point light sources to light up a target. The sense feedback device is disposed on the target and used to collect light intensity information of the light projected on the target by the lighting system. The positioning module calculates a distance between the target and each of the point light sources based on the light intensity information and calculates a positioning location of the target based on the locations of the point light sources and the distances between the target and the point light sources.

34 Claims, 6 Drawing Sheets (51) Int. Cl.
*G01S 1/70* (2006.01)
*G01S 5/08* (2006.01)
*G01S 5/10* (2006.01)
*G01B 11/245* (2006.01)
*G01C 3/08* (2006.01)

(56) References Cited

U.S. PATENT DOCUMENTS

| | | | |
|---|---|---|---|
| 4,888,490 A | 12/1989 | Bass et al. | |
| 5,045,843 A | 9/1991 | Hansen | |
| 5,329,358 A | 7/1994 | Horijon | |
| 5,455,487 A | 10/1995 | Mix et al. | |
| 6,285,318 B1 * | 9/2001 | Schoen | G01S 5/0221 342/357.37 |
| 6,404,079 B1 | 6/2002 | Hsieh | |
| 6,637,973 B1 | 10/2003 | Kim | |
| 7,053,767 B2 | 5/2006 | Petite et al. | |
| 7,164,110 B2 | 1/2007 | Pitigoi-Aron et al. | |
| 7,386,421 B2 | 6/2008 | Miki | |
| 7,843,353 B2 | 11/2010 | Pan et al. | |
| 2003/0137849 A1 | 7/2003 | Alden | |
| 2007/0242583 A1 | 10/2007 | Huang et al. | |
| 2008/0315772 A1 | 12/2008 | Knibbe | |

FOREIGN PATENT DOCUMENTS

| | | |
|---|---|---|
| TW | 266382 | 12/1995 |
| TW | 311674 | 7/1997 |
| TW | M284176 | 12/2005 |
| WO | 2008152545 | 12/2008 |

OTHER PUBLICATIONS

Randall et al., "LuxTrace: indoor positioning using building illumination", Personal and Ubiquitous Computing Journal, Aug. 2006, vol. 11, No. 6, p. 417-p. 428.

Langley, "The Mathematics of GPS", GPS World, Jul./Aug. 1991, vol. 2, No. 7, p. 45-p. 50.

"Office Action of Taiwan Counterpart Application", issued on Jul. 12, 2012, p. 1-p. 18, (Randall et al., Langley).

* cited by examiner

POSITIONING METHOD AND POSITIONING SYSTEM BASED ON LIGHT INTENSITY

CROSS-REFERENCE TO RELATED APPLICATION

This application is a continuation-in-part application of and claims the priority benefit of a prior application Ser. No. 12/469,677, filed on May 20, 2009, now pending. The prior application Ser. No. 12/469,677 claims the benefit of Taiwan application serial no. 98107346, filed on Mar. 6, 2009. The entirety of each of the above-mentioned patent applications is hereby incorporated by reference herein and made a part of this specification.

TECHNICAL FIELD

The disclosure relates to a positioning method and a positioning system based on light intensity.

RELATED ART

Currently, the positioning technique can be divided into two types, namely, outdoor positioning technique and indoor positioning technique. The most commonly used outdoor positioning technique is Global Position System (GPS). GPS has been extensively used in mobile device and can position the location of a person or a car in any place where a satellite signal can be received, so as to provide accurate location information for a user. The precision of the location information has difference from several meters to decades of meters with respect to different hardware components.

On the other hand, current indoor positioning technique can be divided into two types, namely, a technique from outdoor to indoor and a technique from indoor to outdoor. The technique from outdoor to indoor performs a triangular positioning according to the strength of the wireless signal. Here, the strength of the signals transmitted by the transmitting terminal is assumed to be fixed. Hence, by using the attenuation of the signal received by a receiving terminal, the distance between the signal transmitting terminal and the receiving terminal can be estimated, and the location of the receiving terminal can be positioned by the information of the distance. The technique from indoor to outdoor disposes a laser distance measuring device on the receiving terminal to scan the environment features and compare the difference between the environment features and built-in maps so as to estimate the location of the receiving terminal in space.

However, compared with the outdoor environment, the indoor environment is regarded as small space and the arrangement thereof is denser, such that the requirement for precision of positioning system is higher. Nevertheless, since both the technique from indoor to outdoor and the technique from outdoor to indoor still have large errors and cannot compromise with the requirement of the precision, such that currently no indoor positioning system can be used by the mass.

SUMMARY

The disclosure provides a positioning method based on light intensity, which collects light intensity information of a light projected on a target by a lighting system, so as to calculate a positioning location of the target.

The disclosure provides a positioning system based on light intensity, which disposes a sense feedback device on a target to calculate a positioning location of the target, and further to adjust a position and a luminance of a lighting system.

The disclosure provides a positioning method based on light intensity, which includes sequentially adjusting luminance of at least three point light sources of a lighting system, collecting light intensity information of a light projected on a target by the lighting system, and calculating a distance between each of the point light sources and the target according to the light intensity information. Finally, a positioning location of the target is calculated according to a location of each of the point light sources and the distance between each of the point light sources and the target.

The disclosure provides a positioning system based on light intensity, which includes a lighting system, a sense feedback device and a positioning module. The lighting system includes at least three point light sources and sequentially adjusts luminance of the point light sources to project a light. The sense feedback device is used to collect light intensity information of the light projected by the lighting system. The positioning module calculates a distance between each of the point light sources and a target according to the light intensity information collected by the sense feedback device. Then, the positioning module calculates a positioning location of the target according to a location of each of the point light sources and the distance between each of the point light sources and the target.

In view of the above, the positioning method and the positioning system based on light intensity of the disclosure dispose a sense feedback device on a target to collect light intensity information of a light projected on the target by a lighting system. Hence, the positioning location of the target can be calculated based on a relation that the light intensity is inversely proportional to the square of the distance. The lighting system can further adjust its location and luminance according to the positioning location, so as that the light intensity of the light projected on the target can be increased or can match the requirement of a user.

In order to make the aforementioned and other features and advantages of the disclosure more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the disclosure and, together with the description, serve to explain the principles of the disclosure.

DESCRIPTION OF EMBODIMENTS

The disclosure takes advantage of the characteristic that light intensity of light source is adjustable. By using a lighting system to provide a light with the light intensity required by a user or by fine tuning luminance of at least three point light sources of the lighting system, and then by measuring the light intensity of the light received by the target, the disclosure is able to predict the location of the target according to the variation of the light intensity. In addition, the foregoing calculated positioning location can further be used to adjust the location, an irradiation angle, and the luminance of the lighting system, so that the light intensity of the light projected on the target can match a light intensity value input by a user. In order to make the disclosure more comprehensible, embodiments of a positioning system and a positioning method are described below in detail as examples to prove that the invention can actually be realized.

Figure 1:
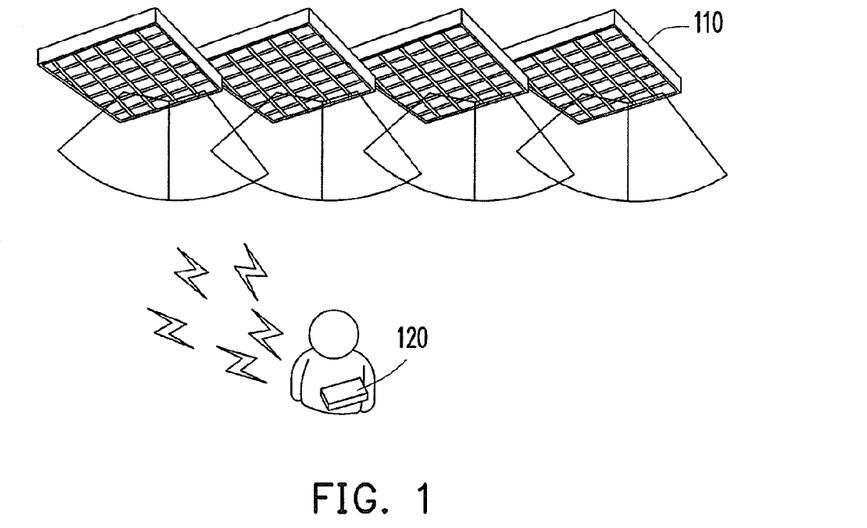
FIG. 1 is a scenario schematic diagram of a positioning system based on light intensity according to an embodiment of the disclosure.

FIG. 1 is a scenario schematic diagram of a positioning system based on light intensity according to an embodiment of the disclosure. Referring to FIG. 1, the position system 100 of the present embodiment is mainly divided into two elements, namely, a lighting system 110 and a sense feedback device 120. The lighting system 110 has a plurality of point light sources that project light averagely to every direction, in which luminance of the point light sources can be adjusted independently to provide light intensity required by a user. The point light sources are, for example, light emitting diode (LED) light sources or other light sources, which are not limited by the present embodiment.

On the other hand, the sense feedback device 120 senses the light intensity of the light projected on its location, and sends the measured light intensity information back to the lighting system 110 in a wireless transmission manner. Then, the lighting system 110 calculates a location of the sense feedback device 120 according to the light intensity information.

It is noted that, the sense feedback device 120 can be disposed on any target so as to measure the light intensity of the light received by the target and provide the same for the lighting system 110 to calculate the location of the target. For example, the sense feedback device can be made as an electronic bookmark, the lighting system is a desktop lamp, and the positioning system can be used as an eye guard lamp system for monitoring and reminding a reading page. The eye guard lamp system can position a precise location of the reading page, and further adjusts luminance and an irradiation angle of the lighting system. In addition, the positioning system can be applied to a lighting system of a surgery, such that the lighting system can automatically adjust the illumination surface and the light intensity according to the requirement of the surgical operation, so as to provide a doctor with enough illumination to perform the surgery. Certainly, in addition to the above conditions, the embodiment can further be applied to other small scale systems. The disclosure is not limited thereto.

Figure 2:
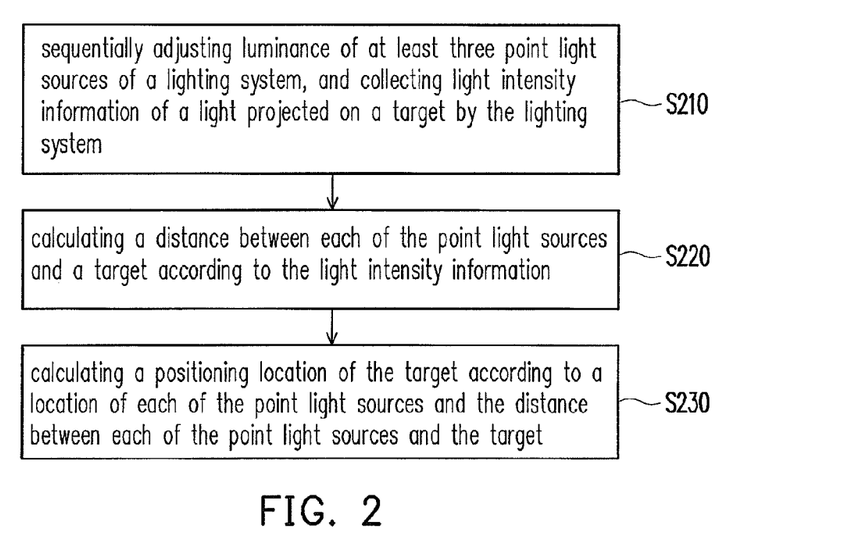
FIG. 2 is a flow chart of a positioning method based on light intensity according to an embodiment of the disclosure.

FIG. 2 is a flow chart of a positioning method based on light intensity according to an embodiment of the disclosure. Referring to FIG. 2, the present embodiment provides a light intensity positioning algorithm, in which a sense feedback reports a present light intensity value to a lighting system, and then the lighting system calculates a location of the sense feedback device. The positioning algorithm can be divided into three stages, namely, collecting light intensity information, calculating a distance between the sense feedback device and the point light source, and calculating the location of the sense feedback device. Detailed steps of each of the stages are introduced in the following.

First, in the stage of collecting light intensity information, the positioning system of the present embodiment uses the lighting system to sequentially adjust luminance of at least three point light sources, and uses the sense feedback device to collect the light intensity information of a light projected by the lighting system (step S210).

In detail, in the present embodiment, the sense feedback device periodically reports the sensed light intensity to the lighting system. The lighting system can adjust luminance of one of the point light sources to be a first luminance $I_1$, and then the sense feedback device senses a first light intensity $L_1$ projected by the lighting system. Next, the lighting system readjusts the luminance of the point light source to be a second luminance $I_2$, such as by increasing luminance $\Delta I$, and thereby the sense feedback device senses a second light intensity $L_2$ of the light projected by the lighting system. The lighting system can sequentially adjust luminance of other point light sources, and get light intensity before and after the luminance change of the point light source and use the same as the light intensity information.

Whenever the sense feedback device complete the measuring of the first light intensity $L_1$ and the second light intensity $L_2$, the lighting system recovers the luminance of the point light source to the original luminance $I_1$, by, for example, subtracting the current luminance $I_2$ by the previously increased luminance $\Delta I$. Then, the lighting system adjusts luminance of another point light source again, and the sense feedback device measures light intensity information of the point light source. By analogy, the present embodiment needs to measure light intensity information of at least three point light sources.

Next, a distance between each of the point light sources and a target is calculated according to the light intensity information measured by the sense feedback device (step S220). Specifically, after obtaining the light intensity information, the lighting system can calculate a light intensity difference between the first light intensity and the second light intensity according to the first light intensity and the second light intensity of each of the point light sources detected before and after the adjustment. Then, a distance corresponding to the light intensity difference is calculated according to a relation that the light intensity is inversely proportional to the square of the distance and used as the distance between the point light source and the target.

Figure 3:
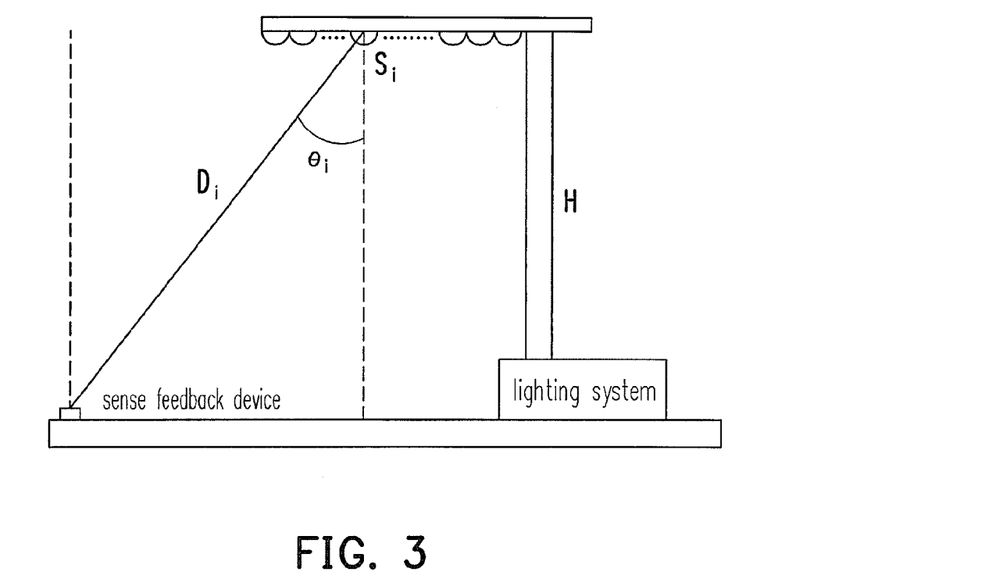
FIG. 3 is a schematic diagram of a distance between a point light source and a sense feedback device according to an embodiment of the disclosure.

For example, FIG. 3 is a schematic diagram of a distance between a point light source and a sense feedback device according to an embodiment of the disclosure. Referring to FIG. 3, by the definition of luminance (unit lumen), an equation (1) can be obtained as follows:

$$Lux = \frac{\text{luminous flux}}{\text{unit area}} \quad (1)$$
$$= \frac{\text{luminosity} \times \text{solid angle}}{\text{unit area}}$$
$$= \frac{\text{luminsosity} \times \cos(\text{solid angle})}{(\text{distance})^2}$$

Here, the height of the lighting system is H; a luminance difference of the light projected by an arbitrarily selected point light source is $\Delta I_i$; the distance between the point light source and the sense feedback device is $D_i$; a relative angle between the point light source and a normal of a plane where the sense feedback device is placed is $\theta_i$. Besides, the light intensity difference detected by the sense feedback device is $\Delta L_i$, where i represents the $i_{th}$ point source. To substitute these terms into the equation (1), than an equation (2) can be obtained as follows:

$$\Delta L_i = \frac{\Delta I_i \times \cos\theta_i}{D_i^2} = \frac{\Delta I_i \times H}{D_i^3} \quad (2)$$

The above-mentioned equation (2) can be further simplified to an equation (3) as follows:

$$D_i = \sqrt[3]{\frac{\Delta I_i \times H}{\Delta L_i}} \quad (3)$$

In the equation (3), since the height H can be measured in advance, and the luminance difference $\Delta I_i$ and the light intensity difference $\Delta L_i$ are known, hence the distance $D_i$ between the point light source $S_i$ and the sense feedback device can be calculated by the equation (3).

It is noted that, if only one distance between the point light source and the sense feedback device is used, only one 3D sphere can be drawn, and a correct location of the sense feedback device can not be decided. As a result, the present embodiment further needs to repeat the above-mentioned steps, so as to calculate the distances between at least three point light sources and the sense feedback device.

After calculating the distances between the at least three point light sources and the sense feedback device, a positioning location of the target can be calculated according to a location of each of the point light sources and the distance between each of the point light sources and the target (step S230). In detail, in this step, a sphere equation corresponding to each of the light sources is respectively derived by using the location of each of the light sources as a center and using the distance between the target and each of the light sources as a radius. Next, two intersection points of the sphere equations of the three point light sources are calculated, and then the intersection point located at a front side of the lighting system is selected to be the positioning location of the target.

Figure 4:
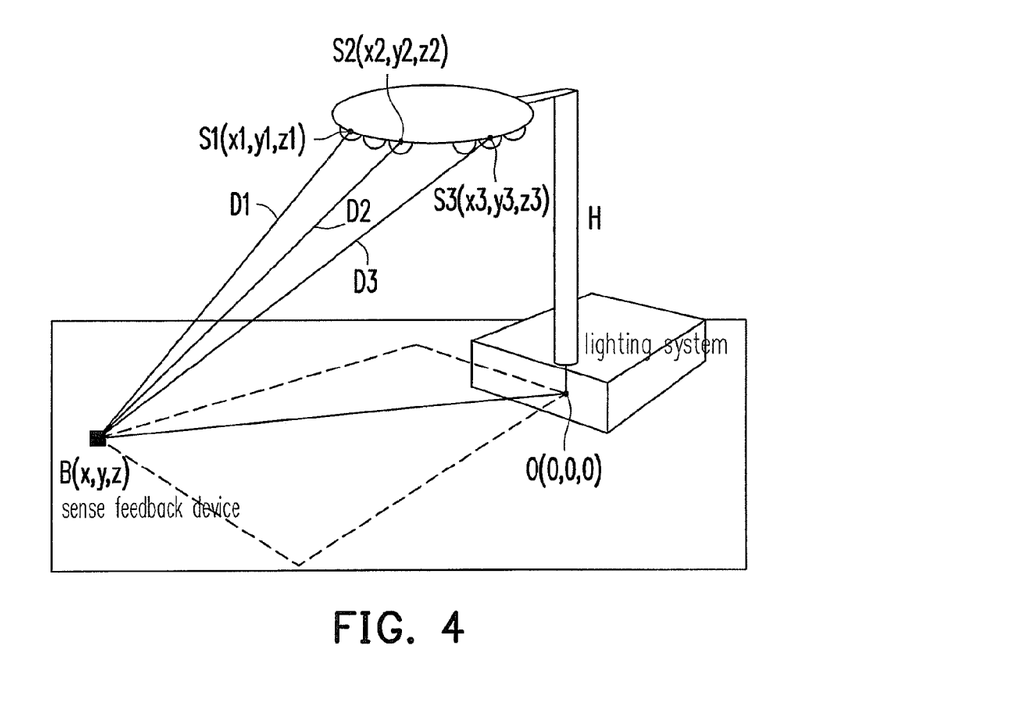
FIG. 4 is a schematic diagram of a distance between each of three point light sources and a sense feedback device according to an embodiment of the disclosure.

For example, FIG. 4 is a schematic diagram of a distance between a point light source and a sense feedback device according to an embodiment of the disclosure. Referring to FIG. 4, it is assumed that the distance between the three point light sources and the sense feedback device are $D_1$, $D_2$ and $D_3$, respectively. Accordingly, three spheres corresponding to the light sources can be drawn by using the locations of the three light sources as a center and using the distance $D_1$, $D_2$ and $D_3$ as a radius. In addition, the three spheres intersect at two intersection points. Since the sense feedback device must be placed at the front side of the lighting system, a correct positioning location of the sense feedback device can be assured to be B(x, y, z).

It should be noted that, in the above-mentioned positioning system and positioning method, the lighting system can include three or more than three point light sources. However, the lighting system only needs to slightly adjust the luminance of one of the point light sources at one time while maintaining the luminance of other point light sources unchanged. Therefore, the whole luminance of the lighting system does not be affected, and the slight change can not easily be sensed by human eyes. It is noted that, after the positioning location is calculated, the disclosure can further adjust an irradiation angle, the location and the luminance of the lighting system, so that the lighting system can provide the same strength of the light intensity for the target in lowest power consumption. One embodiment is further provided for detailed description.

In more specific detail, referring to FIGS. 2, 3, and 4 together, the first step which is S210 of FIG. 2 would be executed. In step S210, the lighting system as illustrated in FIG. 3 and FIG. 4 would sequentially adjust the luminance of three point light sources (S1, S2, S3) of the lighting system, and collecting light intensity information of the light projected on a target B(x, y, z) by the lighting system. The target B(x, y, z) is where the sense feedback device is located. For this particular embodiment, it is assumed that the three point light sources (S1, S2, S3) are in close proximity of each other, and the base O(x, y, z) of the lighting system is assumed to be situated in origin and is presumed to have the coordinate (0, 0, 0). Also the sense feedback device is assumed to be located on the same plane as the base O(0, 0, 0) of the lighting system and therefore has the coordinate B(x, y, 0).

The light intensity information collected during step S210 includes parameters needed for equation (3) to calculate the distance $D_1$, $D_2$, and, $D_3$ between the point light source $S_1$, $S_2$, and $S_3$ and the sense feedback device. The parameters include the height H which can be measured in advance, the luminance difference $\Delta I_1$ $\Delta I_2$ $\Delta I_3$ projected respectively by the light sources $S_1$, $S_2$, and $S_3$, and the subsequent light intensity difference $\Delta L_1$ $\Delta L_2$ $\Delta L_3$ detected by the sense feedback device B(x, y, 0) as the result of the change of luminance of each light source are all known, hence the distance $D_1$, $D_2$, and, $D_3$ between the point light sources $S_1$, $S_2$, $S_3$ and the sense feedback device can be calculated by the equation (3).

In step S220, the lighting system would then calculate the distance $D_1$, $D_2$, and, $D_3$ between each of the light sources $S_1$, $S_2$, $S_3$ and the target (x, y, 0) in which the sense feedback device is located according to equation (3). With the distance $D_1$, $D_2$, and, $D_3$ at hand, the lighting system would execute S230 and calculate the positioning location of the target (x, y, 0) by solving for x and y according to the location of each of the point light sources S1(x1,y1,z1), S2(x2,y2,z2), S3(x3,y3, z3) projected onto the z=0 plane which would be $S_{11}(x_1, y_1, 0)$, $S_{22}(x_2, y_2, 0)$, $S_{33}(x_3, y_3, 0)$, and the distance between each of the point light sources $S_1$, $S_2$, $S_3$ and the target B(x, y, 0) which is $D_1$, $D_2$, and, $D_3$.

To do so, a spherical equation corresponding to each of the light sources has to be respectively derived by using the location of each of the light sources, $S_1$, $S_2$, $S_3$, projected onto the z=0 surface as (A) the center of the sphere and by using the distance between the target B(x, y, 0) and each of the light sources previously calculated to be $D_1$, $D_2$, and $D_3$ as (B) the radius. The locations of the light sources, $S_1$, $S_2$, $S_3$, projected onto the z=0 surface are $S_{1l}(x_1, y_1, 0)$, $S_{22}(x_2, y_2, 0)$, and $S_{33}(x_3, y_3, 0)$. Since there are three light sources, there would be three spherical equations. Next, two of the three point light sources would hypothetically project two spheres onto the surface z=0 with each sphere characterized by its spherical equation. Two spheres could hypothetically have at most two intersection points $B1(x_{b1}, y_{b1})$ and $B2(x_{b2}, y_{b2})$. The two intersections points could substitute back to a third spherical equation and solve for the point x, y, as in B(x, y) to obtain two solutions based on two unknowns. The one intersection point located at a side of the lighting system where the target B(x, y, 0) is located is selected to be the exact positioning location of the target B(x, y, 0).

To be more specific, according to Pythagorean theorem and spherical equation, equation (4) can be obtained from the triangle with vertices B, $S_1$, and $S_{11}$:

$$D_1^2 = H^2 + (x_1-x)^2 + (y_1-y)^2 \quad (4)$$

similarly, equation (5) and (6) can be obtained from the triangle with vertices B(x, y, 0), $S_2$, $S_{22}$ and the triangle with vertices B(x, y, 0), $S_3$, $S_{33}$:

$$D_2^2 = H^2 + (x_2-x)^2 + (y_2-y)^2 \quad (5)$$

$$D_3^2 = H^2 + (x_3-x)^2 + (y_3-y)^2 \quad (6)$$

After the simplification of equation (4) and (5), equation (7) and (8) can be obtained based on equation (4) and (5) as:

$$(x_1-x)^2 + (y_1-y)^2 = D_1^2 - H^2 \quad (7)$$

$$(x_2-x)^2 + (y_2-y)^2 = D_2^2 - H^2 \quad (8)$$

Equation (7) and (8) are two spherical equations projected onto the plane z=0, and under this circumstance, there could only be three possible situations.

Case 1: there is no intersection between the two equations. This is situation is impossible under this particular circumstance. Having no intersection would mean that the two spherical equations have no solutions. As long as there are light sources S1 and S2, the sensor on the target B(x, y, 0) can detect received light sources, and also mathematically there would be a solution to equations (7) and (8).

Case 2: There is only 1 intersection between two spheres projected onto surface of z=0. If there is only 1 intersection, the correct position of target B can be calculated as one intersection means that there is only one solution for the two spherical equations.

Case 3: There are two intersections between the two spherical equations projected onto the surface z=0. Two intersections mean that there are two solutions for the two spherical equations. When two circles are projected on the same z=0 surface, there cannot possibly be more than two intersections. Therefore, equations (7) and (8) would only have two possible solutions. When there are two solutions $B1(x_{b1},y_{b1})$ and $B2(x_{b2},y_{b2})$, these two solutions can be substituted back to equation (6) and solve for x and y as in B(x, y, 0) based on two equations and two unknowns. This works because as the light source S3 changes the light intensity, the target B(x, y, 0) would detect the change of light intensity. However, since one of the intersection between two circles would intersect on one side of the light sources at which the target B(x,y,z) is, the other solution would not be located at B(x, y, z). Therefore, even though there are two solutions or two intersections, only one of the intersection would intersect at point B(x, y, z). Therefore, only one of the solutions would be detected by the sensor, and the other solution does not. The proper solution B(x,y,z) can then be calculated from equation (6).

Figure 5:
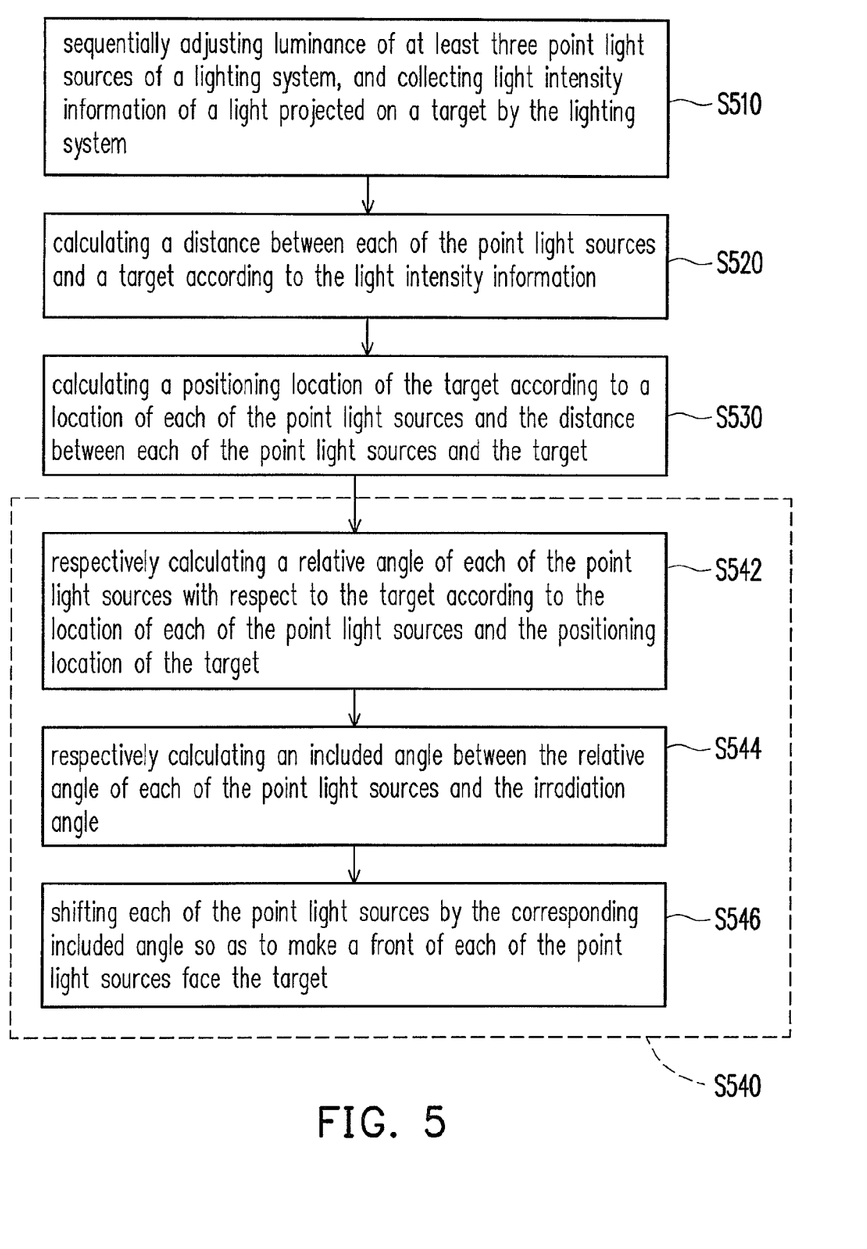
FIG. 5 is a flow chart of a positioning method based on light intensity according to an embodiment of the disclosure.

FIG. 5 is a flow chart of a positioning method based on light intensity according to an embodiment of the disclosure. Referring to FIG. 5, the present embodiment uses a positioning method of the above-mentioned embodiment to calculate the location of the sense feedback device, and adjusts the irradiation angle of the lighting system according to the calculated location. Detailed steps of the positioning method are illustrated in the following.

First, a lighting system sequentially adjusts luminance of at least three point light sources of the lighting system, and a sense feedback device collects light intensity information of a light projected by the lighting system (step S510). Next, a distance between each of the point light sources and the target is calculated according to the light intensity information (step S520). Then, a positioning location of the target is calculated according to a location of each of the point light sources and the distance between each of the point light sources and the sense feedback device (step S530). The detailed content of the above steps are all identical or similar to the steps S510~S530 in the above embodiment, and will not be described herein.

It should be noted that, in the present embodiment, after obtaining the positioning location of the target, the lighting system further adjusts an irradiation angle of each of the point light sources of the lighting system, so as to make the point light sources face the target (step S540). The step can further be divided into following sub-steps.

First, a relative angle of each of the point light sources with respect to the target is respectively calculated according to the location of each of the point light sources and the positioning location of the target (step S542). The aforesaid relative angle represents an angle of the location of the target with respect to the location of the point light source in space.

Next, an included angle between the relative angle of each of the point light sources and the irradiation angle is respectively calculated (step S544). In general, as using a point light source to illuminate, the luminance of the front of the point light source is largest. Hence, as a target facing the front of the point light source, i.e. in the direction of the irradiation angle, the strength of the light intensity received by the target is largest as well. However, the actual situation is that the target normally is not located in the front of the point light source. Instead, normally there is an included angle between the front of the point light source and the target.

Hence, the lighting system can shift each of the point light sources according to the included angle between the relative angle and the irradiation angle so as to make the front of the point light sources face the target (step S546). By using the above operation, the light intensity of the light received by the target can be increased without changing the luminance of the point light source. Hence, the lighting system can provide a light with more sufficient light intensity to the target.

Except the foregoing embodiments, the invention can further shift the location of the lighting system according to the positioning location of the target, so as to make an average of the distances between the point light sources and the target the shortest. Hence, the lighting system can provide a light with more sufficient light intensity to the target.

Figure 6:
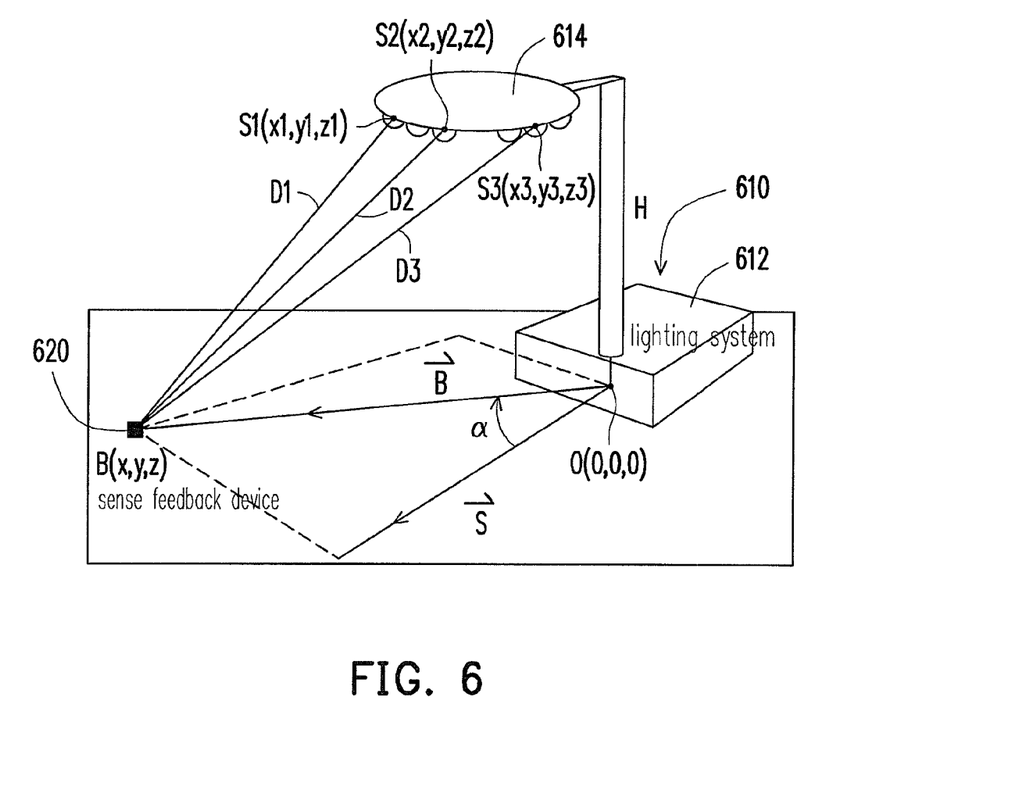
FIG. 6 is an example of shifting a lighting system according to a positioning location of a target according to an embodiment of the disclosure.

FIG. 6 is an example of shifting a lighting system according to a positioning location of a target according to an embodiment of the disclosure. Referring to FIG. 6, the present embodiment uses a desktop lamp 610 as a lighting system. The desktop lamp 610 includes a lamp stand 612 and a lantern 614. The lamp stand 612 is located at O(0, 0, 0). The lantern 614 is located above O(0, 0, 0) with a height H, and extends to a direction $\vec{S}$, wherein a plurality of light sources are disposed in the lantern 614. The present embodiment assumes that the point light sources used to calculate a location of a sense feedback device 620 are point light sources $S_1$, $S_2$ and $S_3$, which are located at $S_1(x_1, y_1, z_1)$, $S_2(x_2, y_2, z_2)$ and $S_3(x_3, y_3, z_3)$, respectively. The distance between the point light sources $S_1$, $S_2$ and $S_3$ and the sense feedback device 620 is $D_1$, $D_2$ and $D_3$, respectively. It is noted that, in the embodiment, an angle α is between the direction $\vec{S}$ and a relative direction $\vec{B}$, where the direction $\vec{S}$ is a direction the lantern 614 faces, and the relative direction $\vec{B}$ is a relative direction of the sense feedback device with respected to the lantern 614. As the lighting system 610 obtains the angle α, the lighting system 610 can rotate the lantern 614 with angle α, so as to make an average of the distances $\overline{D}=(D_1+D_2+D_3)/3$ between the point light sources $S_1$, $S_2$, $S_3$ and the sense feedback device 620 is the shortest.

Except the foregoing method of adjusting the irradiation angle and location of the point light source, the invention can further adjust luminance of each of the point light sources according to a positioning location of the target, so as to make the light intensity of the light received by the target match the requirement of a user. Another embodiment is described in detail hereinafter.

Figure 7:
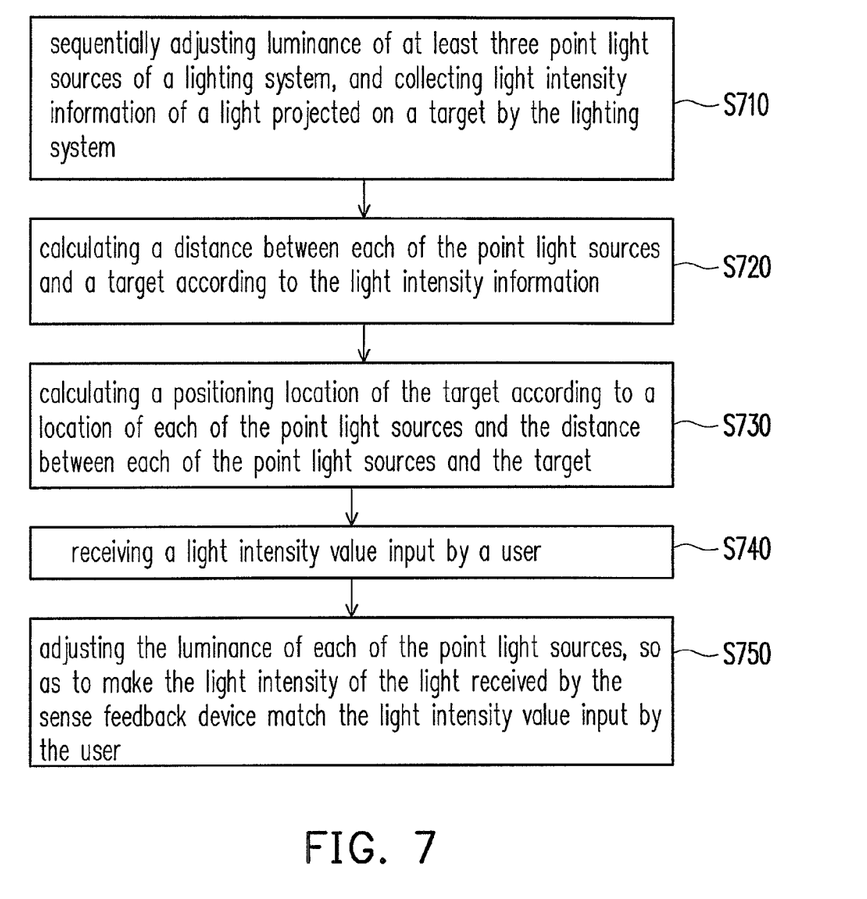
FIG. 7 is a flow chart of a positioning method based on light intensity according to an embodiment of the disclosure.

FIG. 7 is a flow chart of a positioning method based on light intensity according to an embodiment of the disclosure. Referring to FIG. 7, the present embodiment uses a positioning method of the above-mentioned embodiment to calculate a location of a sense feedback device, and adjusts each of point light sources of a lighting system according to the location of a sense feedback device. The detail steps of the positioning method are illustrated in the following.

First, a lighting system sequentially adjusts at least three point light sources of the lighting system, and a sense feedback device collects light intensity information of a light projected by the lighting system (step S710). Next, a distance is calculated between each of the point light sources and the target according to the light intensity information (step S720). Then, a positioning location of the target is calculated according to a location of each of the point light sources and the distance between each of the point light sources and the sense feedback device (step S730). The detailed content of the above steps are all identical or similar to the steps S710~S730 in the above embodiment, and will not be described herein.

It should be noted that the present embodiment further includes providing a user to input a light intensity value required by the user, and adjusting luminance of the lighting system after obtaining the positioning location of the target. In this embodiment, a light intensity value input by a user is received by the sense feedback device (step S740), and the luminance of each of the point light sources of the lighting system is adjusted, so as to make the light intensity of the light received by the target match the light intensity value input by the user (step S750).

In detail, the lighting system can adjust the luminance of each of the point light sources according to the distance between each of the point light sources and the target, so as to make the light intensity of the light received by the target match the light intensity value input by the user. If the method is applied to the desktop lamp 610 as shown in FIG. 6, then the lighting system increases the luminance of the point light source which is closest to the target, and decreases the luminance of other point light sources, so as to provide the light intensity required by the user in most economical way with lowest power consumption.

In addition, if the method is applied to a general indoor lighting system, then the lighting system increases the luminance of the point light source which is right above the sense feedback device, and decreases the luminance of other point light sources relatively. Hence, the lighting system does not only provide the light with the same light intensity to the sense feedback device, but also dims the light intensity of the other point light sources located outside the sense feedback device, so as to reduce the electricity consumption.

The descriptions in relation to three methods of adjusting the lighting system according to the positioning location of the target are provided above. The methods are aimed at providing the same strength of the light intensity of the light in a most power saving way, and making the light intensity of the light provided by the lighting system be able to match the requirement of the user. Certainly, those skilled in the art can arbitrarily adjust or combine the above-mentioned adjusting methods of the lighting system according to the actual requirement, such as adjusting the irradiation angle first and then adjusting the luminance; adjusting the location first and then adjusting the luminance, or adjusting the irradiation angle and the location first and then adjusting the luminance, so as that make the lighting system of the present embodiment be able to match the user's requirement.

In the above-mentioned positioning systems and methods, the calculation of the positioning location is performed by the lighting system, for example. However, in another embodiment, the calculation of the positioning location may be performed by the sense feedback device. The above two methods both can achieve the effectiveness of positioning the target and adaptively adjusting the lighting system, and one embodiment corresponding to each of the methods is respectively exemplified hereinafter.

Figure 8:
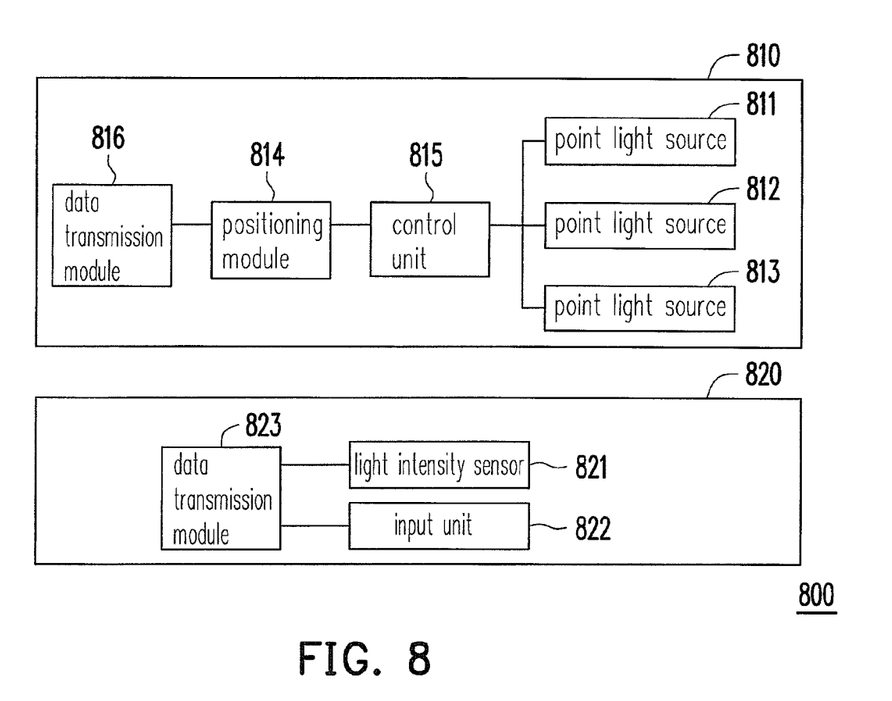
FIG. 8 is a block diagram of a positioning system based on light intensity according to an embodiment of the disclosure.

FIG. 8 is a block diagram of a positioning system based on light intensity according to an embodiment of the disclosure. Referring FIG. 8, a positioning system 800 of the present embodiment includes a lighting system 810 and a sense feedback device 820. Besides, a positioning module 814 disposed in the lighting system 810 is further included to calculate a positioning location of the sense feedback device 820. Functions of the components are introduced in the following.

The lighting system 810 is disposed with at least three point light sources 811, 812, 813, a positioning module 814, a control unit 815 and a data transmission module 816. When the lighting system 810 positions a target, the control unit 815 sequentially adjusts luminance of the point light sources 811, 812, 813 so as to project a light.

The sense feedback device 820 includes a light intensity sensor 821, an input unit 822 and a data transmission module 823. When the lighting system 810 sequentially adjusts luminance of the point light sources 811, 812, 813, the sense feedback device 820 uses the light intensity sensor 821 to sense a light intensity value before and after the point light sources being adjusted respectively, and uses the data transmission module 816 to send the light intensity values to the lighting system 810. Hence, the positioning module 814 of the lighting system 810 can calculate a poisoning location of the sense feedback device 820.

In brief, the sense feedback device 820 merely measures the light intensity and sends light intensity information according to the light intensity. Whenever the sense feedback device 820 senses the light intensity information, it sends the light intensity information back to the lighting system 810. Hence, the positioning module 814 of the lighting system 810 performs a calculation to calculate a positioning location of the sense feedback device 820. The method of calculating the positioning location by the positioning module 814 has been described in the above-mentioned embodiments, and a detailed description thereof is omitted.

It is noted that, the sense feedback device 820 further uses the input unit 822 to receive a light intensity value input by a user and uses the data transmission module 816 to send the light intensity value to the lighting system 810. Hence, the control unit 815 of the positioning module 814 is able to adjust the location and the luminance of the point light sources 811, 812, 813 according to the light intensity value, so that the light intensity of the light received by the sense feedback device 820 can match the user's requirement. A relevant adjustment method has been described in the preceding embodiment, and is not repeated herein.

Figure 9:
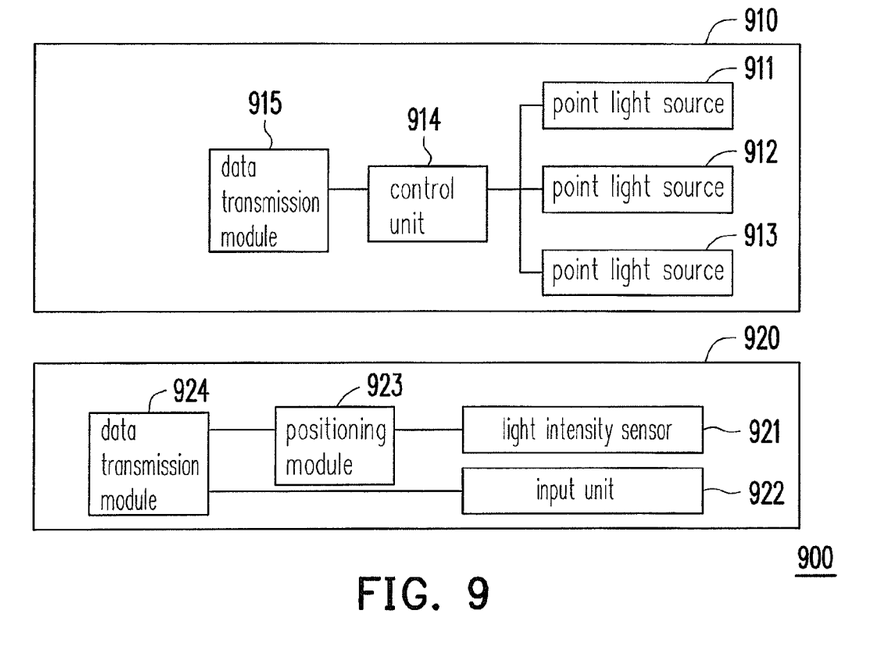
FIG. 9 is a block diagram of a positioning system based on light intensity according to an embodiment of the disclosure.

On the other side, FIG. 9 is a block diagram of a positioning system based on light intensity according to an embodiment of the disclosure. Referring to FIG. 9, a positioning system 900 of the embodiment includes a lighting system 910 and a sense feedback device 920. Besides, a positioning module 923 disposed in the lighting system 910 is further included for calculating a positioning location of the target. Functions of the components are introduced in the following.

The lighting system 910 is disposed with at least three point light sources 910, 911, 912, a positioning module 913, a control unit 914 and a data transmission module 915. When the lighting system 910 positions a target, the control unit 914 sequentially adjusts luminance of the point light sources 911, 912, 913 so as to project a light.

The sense feedback device 920 includes a light intensity sensor 921, an input unit 922, a positioning module 923 and a data transmission module 924. When the lighting system 910 sequentially adjusts luminance of the point light sources 911, 912, 913, the sense feedback device 920 uses the light intensity sensor 921 to respectively sense a light intensity value before and after the point light sources being adjusted, and provide the same for the positioning module 923 to calculate a positioning location of the sense feedback device 920. The calculation result of the positioning location is sent to the data transmission module 915 of the lighting system 910 by the data transmission module 924. The method of calculating the positioning location by the positioning module 923 has been described in the above-mentioned embodiments, and a detailed description thereof is omitted.

After the lighting system 910 receives the positioning location of the sense feedback device 920, the control unit 914 adjusts the location and the luminance of the point light sources 911, 912, 913, so that the lighting system 910 can provide sufficient light intensity in a most economical way with lowest power consumption. It is noted that, the sense feedback device 920 further uses the input unit 922 to receive a light intensity value input by a user and uses the data transmission module 923 to send the light intensity value to the data transmission module 915 of the lighting system 910. Hence, after the lighting system 910 receives the light intensity value, the positioning module 914 adjusts the location and the luminance of the point light sources 911, 912, 913 according to the light intensity value, so that the light intensity of the light received by the sense feedback device 920 can match the user's requirement. A relevant adjustment method has been described in the preceding embodiment, and is not repeated herein.

In addition, in still another embodiment, the above-mentioned part of adjusting the light intensity value and the location of the point light source 911, 912, 913 can integrally perform in the sense feedback device 920. The lighting system 910 only needs to adjust the light intensity values and the locations of the point light sources 911, 912, 913 according to an instruction commanded by the sense feedback device 920.

In summary, the positioning method and the positioning system based on the light intensity of the disclosure use the lighting intensity as a medium, use the sense feedback device to sense the light intensity, and sending the light intensity information back to the light system in a wireless transmission manner, such that the lighting system can calculate the location of the sense feedback device by the light intensity positioning algorithm. Hence, the disclosure may achieve the purpose of positioning only by sensing the light intensity without the need of an additional medium. In addition, the invention further combines the above-mentioned light positioning technique to design a set of wireless sensing equipment and lighting equipment, so as to provide a lighting system which can automatically adjust light intensity, irradiation angles and directions of light sources. Hence, the eye fatigue resulting from excess or insufficient brightness can be reduced.

Although the disclosure has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A positioning method based on light intensity, comprising:
    sequentially adjusting luminance of three point light sources of a lighting system located on a first surface to obtain changes of luminance for each of the three point light sources and detecting, by a target located on the first surface, changes of light intensities from the three point light sources in response to the changes of luminance;
    calculating a distance between each of the three point light sources and the target based on the changes of luminance and the changes of light intensities;
    setting up spherical equations using a position of each of the three point light sources as a center and using the distance between each of the three point light sources and the target as a radius; and
    calculating a position of the target by solving the spherical equations.

2. The positioning method based on light intensity of claim 1, wherein the step of sequentially adjusting luminance of the three point light sources of the lighting system located on the first surface to obtain the changes of luminance for each of the three point light sources and detecting, by the target located on the first surface, the changes of light intensities from the three point light sources in response to the changes of luminance comprises:
    adjusting the luminance of one of the point light sources to be a first luminance;
    sensing a first light intensity of the light detected by the target;
    adjusting the luminance of the one of the point light sources to be a second luminance;
    sensing a second light intensity of the light detected by the target; and
    repeating above steps for other two of the three point light sources so as to obtain the changes of light intensities detecting, by the target located on the first surface, based on the changes of luminance for each of the three point light sources.

3. The positioning method based on light intensity of claim 1, wherein the step of calculating the distance between each of the three point light sources and the target based on the changes of luminance and the changes of light intensities comprises:
    obtaining a height of the lighting system;
    calculating a first result by multiplying the changes of luminance by the height and dividing by the changes of light intensities; and
    taking a cube root of the first result to obtain the distance.

4. The positioning method based on light intensity of claim 1, wherein the step of setting up the spherical equations using the position of each of the three point light sources as the center and using the distance as the radius comprises:
    selecting two spheres projected onto the first surface using the position of each of the three point light sources as the center and using the distance as the radius; and
    locating at least one intersection between the two spheres.

5. The positioning method based on light intensity of claim 1, wherein the method further comprises:
adjusting an irradiation angle of each of the point light sources of the lighting system, so as to make the point light sources face the target.

6. The positioning method based on light intensity of claim 5, wherein the step of adjusting an irradiation angle of each of the point light sources of the lighting system, so as to make the point light sources face the target comprises:
respectively calculating a relative angle of each of the point light sources with respect to the target according to a location of each of the point light sources and a location of the target;
respectively calculating an included angle between the relative angle of each of the point light sources and the irradiation angle; and
shifting each of the point light sources by the corresponding included angle so as to make a front of each of the point light sources face the target.

7. The positioning method based on light intensity of claim 1, wherein the method further comprises:
shifting the location of the lighting system so as to make an average of the distances between each of the point light sources and the target is the shortest.

8. The positioning method based on light intensity of claim 1, wherein after the step of calculating the position of the target by solving the spherical equations, the method further comprises:
receiving a light intensity value inputted by a user; and
adjusting the luminance of each of the point light sources of the lighting system, so as to make the light intensity of the light received by the target to match the light intensity value inputted by the user.

9. The positioning method based on light intensity of claim 8, wherein before the step of adjusting the luminance of each of the point light sources of the lighting system, so as to make the light intensity of the light received by the target to match the light intensity value inputted by the user, the method further comprises:
adjusting an irradiation angle of each of the point light sources of the lighting system, so as to make the point light sources face the target.

10. The positioning method based on light intensity of claim 8, wherein before the step of adjusting the luminance of each of the point light sources of the lighting system, so as to make the light intensity of the light received by the target to match the light intensity value inputted by the user, the method further comprises:
shifting the position of the lighting system, so as to make an average of the distances between the target and each of the point light sources is the shortest.

11. The positioning method based on light intensity of claim 8, wherein before the step of adjusting the luminance of each of the point light sources of the lighting system, so as to make the light intensity of the light received by the target to match the light intensity value inputted by the user, the method further comprises:
adjusting the luminance of the point light sources according to the distance between the target and each of the point light sources, so as to make the luminance of the point light source which is closest to the target be greater than the luminance of the other point light sources.

12. A positioning system based on light intensity, comprising:
a lighting system, comprising three point light sources, the lighting system sequentially adjusting luminance of the three point light sources of the lighting system located on a first surface to obtain changes of luminance for each of the three point light sources;
a sense feedback device detecting, by a target located on the first surface, changes of light intensities from the three point light sources in response to the changes of luminance; and
a positioning module calculating a distance between each of the three point light sources and the target based on the changes of luminance and the changes of light intensities, setting up spherical equations using a position of each of the three point light sources as a center and using the distance between each of the three point light sources and the target as a radius, and calculating a position of the target by solving the spherical equations.

13. The positioning system based on light intensity of claim 12, wherein the lighting system, comprising the three point light sources, the lighting system sequentially adjusting luminance of the three point light sources of the lighting system located on the first surface to obtain the changes of luminance for each of the three point light sources comprises:
adjusting the luminance of one of the point light sources to be a first luminance and recording a change of luminance for the one of the point light sources; and
repeating above steps for other two of the three point light sources so as to obtain the changes of luminance for each of the three point light sources.

14. The positioning system based on light intensity of claim 13, wherein the sense feedback device detecting, by the target located on the first surface, the changes of light intensities from the three point light sources in response to the changes of luminance comprises:
detecting by the target a first change of light intensity from the adjusting the luminance of one of the point light sources; and
detecting by the target a second change of light intensity and a third change of light intensity from the adjusting the luminance of the other two of the three point light sources so as to detect the changes of light intensities from the three point light sources.

15. The positioning system based on light intensity of claim 12, wherein the positioning module calculates the distance by obtaining a height of the lighting system, calculates a first result by multiplying the changes of luminance by the height and dividing by the changes of light intensities; and takes a cube root of the first result to obtain the distance.

16. The positioning system based on light intensity of claim 12, wherein the positioning module sets up the spherical equations by selecting two spheres projected onto the first surface using the position of each of the three point light sources as the center and using the distance between each of the three point light sources and the target as the radius, and locates at least one intersection between the two spheres.

17. The positioning system based on light intensity of claim 12, wherein the positioning module is disposed on the sense feedback device.

18. The positioning system based on light intensity of claim 17, wherein the sense feedback device comprises:
a light intensity sensor sensing a light intensity information of the light projected by the lighting system so as to provide the light intensity information to the positioning module; and
a data transmission module sending positioning location calculated by the positioning module to the lighting system.

19. The positioning system based on light intensity of claim 18, wherein the lighting system further comprises:
 a first control unit adjusting an irradiation angle of each of the point light sources according to the positioning location of the sense feedback device, so as to make the point light sources face the sense feedback device.

20. The positioning system based on light intensity of claim 19, wherein the first control unit respectively calculates a relative angle of each of the point light sources with respect to the sense feedback device according to the positioning location of the sense feedback device and the location of each of the point light sources, calculates an included angle between the relative angle of each of the point light sources and the irradiation angle, and shifts each of the point light sources by the corresponding included angle, so as to make a front of each of the point light sources face the sense feedback device.

21. The positioning system based on light intensity of claim 18, wherein the lighting system further comprises:
 a second control unit shifting the position of each of the point light sources so as to make an average of the distances between each of the point light sources and the sense feedback device being the shortest.

22. The positioning system based on light intensity of claim 18, wherein the sense feedback device further comprises:
 an input unit receiving a light intensity value inputted by a user.

23. The positioning system based on light intensity of claim 22, wherein the data transmission module further sends the light intensity value received by the input unit to the lighting system.

24. The positioning system based on light intensity of claim 23, wherein the lighting system further comprises:
 a third control unit adjusting the luminance of each of the point light sources, so as to make the light intensity of the light received by the sense feedback device match the light intensity value inputted by the user.

25. The positioning system based on light intensity of claim 24, wherein the third control unit adjusts the luminance of the point light sources according to the distances between the point light sources and the sense feedback device, so as to make the luminance of the point light source, which is closest to the sense feedback device, be greater than the luminance of the other point light sources.

26. The positioning system based on light intensity of claim 12, wherein the positioning module is disposed on the lighting system.

27. The positioning system based on light intensity of claim 26, wherein the sense feedback device comprises:
 a light intensity sensor sensing a light intensity information of the light projected by the lighting system, so as to provide the light intensity information to the positioning module; and
 a data transmission module sending the positioning location collected by the sense feedback device to the lighting system for the positioning module to calculate the positioning location of the sense feedback device.

28. The positioning system based on light intensity of claim 27, wherein the lighting system further comprises:
 a fourth control unit adjusting an irradiation angle of each of the point light sources according to the positioning location of the sense feedback device, so as to make the point light sources face the sense feedback device.

29. The positioning system based on light intensity of claim 28, wherein the fourth control unit respectively calculates a relative angle of each of the point light sources with respect to the sense feedback device according to the position of each of the point light sources and a positioning location the sense feedback device, calculates an included angle between the relative angle corresponding to each of the point light sources and the irradiation angle, and shifts each of the point light sources by the corresponding included angle, so as to make a front of each of the point light sources face the sense feedback device.

30. The positioning system based on light intensity of claim 27, wherein the lighting system further comprises:
 a fifth control unit shifting the position of each of the point light sources, so as to make an average of the distances between each of the point light sources and the sense feedback device being the shortest.

31. The positioning system based on light intensity of claim 27, wherein the sense feedback device further comprises:
 an input unit receiving a light intensity value inputted by a user.

32. The positioning system based on light intensity of claim 31, wherein the data transmission module further sends the light intensity value received by the input unit to the lighting system.

33. The positioning system based on light intensity of claim 32, wherein the lighting system further comprises:
 a sixth control unit adjusting luminance of each of the point light sources, so as to make the light intensity of the light received by the sense feedback device match the light intensity value inputted by the user.

34. The positioning system based on light intensity of claim 32, wherein the sixth control unit adjusts the luminance of the point light sources according to the distances between the point light sources and the sense feedback device, so as to make the luminance of the point light source, which is closest to the sense feedback device, be greater than the luminance of the other point light sources.

\* \* \* \* \*